United States Patent
Kaneyoshi et al.

(10) Patent No.: US 10,266,763 B2
(45) Date of Patent: Apr. 23, 2019

(54) MN-ACTIVATED COMPLEX FLUORIDE PHOSPHOR AND METHOD OF PRODUCING THEREOF

(71) Applicant: SHIN-ETSU CHEMICAL CO., LTD., Tokyo (JP)

(72) Inventors: Masami Kaneyoshi, Echizen (JP); Hirofumi Kawazoe, Echizen (JP); Isamu Fujioka, Echizen (JP); Kazuhiro Wataya, Echizen (JP); Hajime Nakano, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 268 days.

(21) Appl. No.: 15/292,745

(22) Filed: Oct. 13, 2016

(65) Prior Publication Data
US 2017/0107425 A1    Apr. 20, 2017

(30) Foreign Application Priority Data

Oct. 14, 2015 (JP) .................. 2015-202674
Jul. 8, 2016 (JP) .................. 2016-136010
Sep. 6, 2016 (JP) .................. 2016-173363

(51) Int. Cl.
C09K 11/61 (2006.01)
(52) U.S. Cl.
CPC .................. C09K 11/617 (2013.01)
(58) Field of Classification Search
CPC .................. C09K 11/617
See application file for complete search history.

(56) References Cited

U.S. PATENT DOCUMENTS 3,576,756 A  4/1971 Russo
7,358,542 B2 4/2008 Radkov et al.
(Continued)

FOREIGN PATENT DOCUMENTS

JP  2009-528429 A  8/2009
JP  4582259 B2  11/2010
(Continued)

OTHER PUBLICATIONS

Bode et al., "Über eine neue Darstellung des Kalium-hexafluoromanganats (IV)", (1953), vol. 65, pp. 304, (Cited in Specification). (2 pages).
(Continued)

*Primary Examiner* — Matthew E. Hoban
(74) *Attorney, Agent, or Firm* — Westerman, Hattori, Daniels & Adrian, LLP

(57) ABSTRACT

Provided is a method of producing a Mn-activated complex fluoride phosphor, the method including: mixing a red phosphor as a Mn-activated complex fluoride represented by the following formula (1):

$$K_2MF_6:Mn \quad (1)$$

wherein M is one or two or more of tetravalent elements selected from the group consisting of Si, Ti, Zr, Hf, Ge and Sn and necessarily includes Si, with $K_2MnF_6$ in solid state and optionally with a hydrogenfluoride represented by the following formula (2):

$$AF \cdot nHF \quad (2)$$

wherein A is one or two or more of alkali metals and/or ammonium selected from the group consisting of Li, Na, K, Rb and $NH_4$ and necessarily includes K, and n is a number of 0.7 to 4, in solid state; and heating the resulting mixture at a temperature of 100 to 500° C.
(Continued)

FLUORESCENT EMISSION SPECTRUM AND FLUORESCENT EXCITATION SPECTRUM

According to the present invention, it is possible to obtain a Mn-activated complex fluoride phosphor which can be used with smaller amount as compared to those according to the related art.

2 Claims, 6 Drawing Sheets

(56) References Cited

U.S. PATENT DOCUMENTS

| | | | |
|---|---|---|---|
| 8,491,816 B2 | 7/2013 | Hong et al. | |
| 8,974,696 B2 | 3/2015 | Kaneyoshi et al. | |
| 2015/0132585 A1* | 5/2015 | Pan | C04B 35/2675 428/446 |
| 2015/0329770 A1* | 11/2015 | Kaneyoshi | B05D 1/18 252/301.36 |
| 2015/0380613 A1* | 12/2015 | Hiramatsu | C09K 11/617 257/98 |

FOREIGN PATENT DOCUMENTS

| | | | |
|---|---|---|---|
| JP | 2012-224536 A | | 11/2012 |
| WO | WO2014/103932 | * | 7/2014 |
| WO | 2015/115189 A1 | | 8/2015 |

OTHER PUBLICATIONS

Hoppe et al., "Mangan-, Chrom- und Vanadinkomplexe", (1950), vol. 262, pp. 25, (Cited in Specification). (9 pages).

Cox et al., "Complex Fluorides. Part II.* Studies on Fluoroferrates and on Hydrogen Bonding in Complex Fluorides", (1954), pp. 1798, (Cited in Specification). (7 pages).

"New Experimental Chemistry Course 8, Synthesis of Inorganic Compounds III," edited by The Chemical Society of Japan, Published by Maruzen Co., Ltd., (1977), pp. 1166, (Cited in Specification). (2 pages).

Hoppe et al., "Über Fluoromanganate der Alkalimetalle", (1961), vol. 307, pp. 276, (Cited in Specification) (15 pages).

* cited by examiner

MN-ACTIVATED COMPLEX FLUORIDE PHOSPHOR AND METHOD OF PRODUCING THEREOF

CROSS-REFERENCE TO RELATED APPLICATION

This non-provisional application claims priority under 35 U.S.C. § 119(a) on Patent Application Nos. 2015-202674, 2016-136010 and 2016-173363 filed in Japan on Oct. 14, 2015, Jul. 8, 2016 and Sep. 6, 2016, respectively, the entire contents of which are hereby incorporated by reference.

TECHNICAL FIELD

The present invention relates to a Mn-activated complex fluoride red phosphor (complex fluoride phosphor) represented by the formula $K_2MF_6$:Mn (wherein M is one or two or more of tetravalent elements selected from the group consisting of Si, Ti, Zr, Hf, Ge and Sn, and necessarily includes Si) and useful as a red phosphor for blue light emitting diode (LED), and a method of producing a Mn-activated complex fluoride red phosphor.

BACKGROUND ART

For the purpose of enhancing color rendering properties of a white LED or enhancing color reproducibility in the case where a white LED is used as back light of liquid crystal displays, there is needed a phosphor that is excited with light corresponding to near ultraviolet to blue LEDs to emit red light, and researches on the phosphor are now being in progress. In JP-A 2009-528429 (Patent Document 1), a complex fluoride phosphor in which Mn is added to a complex fluoride represented by the formula $A_2MF_6$ (wherein A is Na, K, Rb or the like, and M is Si, Ge, Ti or the like) or the like is described to be useful.

As a method for producing the above-mentioned phosphor, Patent Document 1 discloses a method wherein a hydrofluoric acid solution including all the component elements dissolved or dispersed therein is subjected to evaporation and concentration, thereby precipitating the desired phosphor. Another production method is disclosed in U.S. Pat. No. 3,576,756 (Patent Document 2), wherein hydrofluoric acid solutions in which the respective component elements are dissolved are mixed together, and acetone as a water-soluble organic solvent is added to the mixed solution to lower solubility, thereby precipitating the desired phosphor. Further, Japanese Patent No. 4582259 (Patent Document 3) and JP-A 2012-224536 (Patent Document 4) disclose a method wherein element M and element A in the above-mentioned formula are individually dissolved in different hydrofluoric acid-including solutions, Mn is added to either of the solutions, and thereafter the two solutions are mixed together, to precipitate the desired phosphor.

In all the known processes for producing a Mn-added $A_2MF_6$ complex fluoride phosphor as mentioned above, it is necessary to use high-concentration hydrofluoric acid in a considerably large amount as compared to the amount of the phosphor obtained. The corrosive property of hydrofluoric acid and its toxicity to human bodies constitute difficulties in carrying out the phosphor production processes, particularly on a large scale.

In connection with this problem, one of the inventors relevant to the present invention found out that, when production of a red phosphor as a Mn-activated complex fluoride is carried out not essentially by a wet process but by a method of mixing raw material powders and heating the powder mixture to effect diffusion and migration of substances to thereby produce the desired complex fluoride phosphor, a major part of the phosphor production process can be carried out without using hydrofluoric acid. The finding is described in WO 2015/115189 (Patent Document 5).

On the other hand, the phosphors hitherto disclosed in the above-mentioned documents and the like, such as $K_2SiF_6$:Mn, have the following problem. The problem is that the amount of the phosphor needed for obtaining the desired red color, specifically, the amount of the red phosphor itself needed for obtaining white light as a whole in conjunction with, for example, the light of blue LED and the light of green or yellow phosphor, is large as compared to the amounts of the phosphors for other luminescent colors or as compared to the amounts of other kinds of red phosphors.

Note that related-art documents related to the present invention include the following documents.

CITATION LIST

Patent Document 1: JP-A 2009-528429
Patent Document 2: U.S. Pat. No. 3,576,756
Patent Document 3: Japanese Patent No. 4582259
Patent Document 4: JP-A 2012-224536
Patent Document 5: WO 2015/115189
Non-Patent Document 1: H. Bode, H. Jenssen, F. Bandte, Angew. Chem., vol. 65, 1953, p. 304
Non-Patent Document 2: E. Huss, W. Klemm, Z. Anorg, Allg. Chem., vol. 262, 1950, p. 25
Non-Patent Document 3: B. Cox, A. G. Sharpe, J. Chem. Soc., 1954, p. 1798
Non-Patent Document 4: New Experimental Chemistry Course 8, "Synthesis of Inorganic Compounds III," edited by The Chemical Society of Japan, published by Maruzen Co., Ltd., 1977, p. 1166
Non-Patent Document 5: R. Hoppe, W. Liebe, W. Daehne, Z. Anorg, Allg. Chem., vol. 307, 1961, p. 276

SUMMARY OF THE INVENTION

An object of the present invention is to provide a manganese-activated complex fluoride red phosphor which is used with smaller amount as compared to those according to the related art, and a method of producing the phosphor.

Paying attention to the fact that the Mn-activated complex fluoride red phosphors conventionally produced, such as $K_2SiF_6$:Mn, have had problems in that the Mn content is comparatively low or that the Mn content is sufficiently high but the efficiency of conversion from blue color to red color is lowered for some reason, the inventors made extensive and intensive investigations, as a result, the inventors found out conditions under which a complex fluoride phosphor having a high Mn content and being high in blue-to-red conversion efficiency (internal quantum efficiency) can be produced.

In one aspect of the present invention, there is provided a method of producing a Mn-activated complex fluoride phosphor, the method including:

mixing a red phosphor as a Mn-activated complex fluoride represented by the following formula (1):

$$K_2MF_6:Mn \qquad (1)$$

wherein M is one or two or more of tetravalent elements selected from the group consisting of Si, Ti, Zr, Hf, Ge and Sn and necessarily includes Si, with $K_2MnF_6$ in solid state and optionally with a hydrogenfluoride represented by the following formula (2):

$$AF \cdot nHF \quad (2)$$

wherein A is one or two or more of alkali metals and/or ammonium selected from the group consisting of Li, Na, K, Rb and $NH_4$ and necessarily includes K, and n is a number of 0.7 to 4, in solid states and heating the resulting mixture at a temperature of 100° C. to 500° C.

In the method as above, preferably, a reaction mixture obtained by the heating is washed with an inorganic acid solution or a fluoride solution to remove unnecessary components, followed by solid-liquid separation and drying the separated solid.

In another aspect of the present invention, there is provided a Mn-activated complex fluoride phosphor being a red phosphor and represented by the above formula (1), wherein the molar ratio or atomic ratio represented by the following formula (3):

$$Mn/(M+Mn) \quad (3)$$

is in the range from 0.06 to 0.25, and an internal quantum efficiency of fluorescence with respect to excitation light of 450 nm is at least 0.75.

Advantageous Effect of the Invention

According to the present invention, it is possible to obtain a Mn-activated complex fluoride phosphor which can be used with smaller amount as compared to those according to the related art.

DESCRIPTION OF THE PREFERRED EMBODIMENTS

Figure 1:
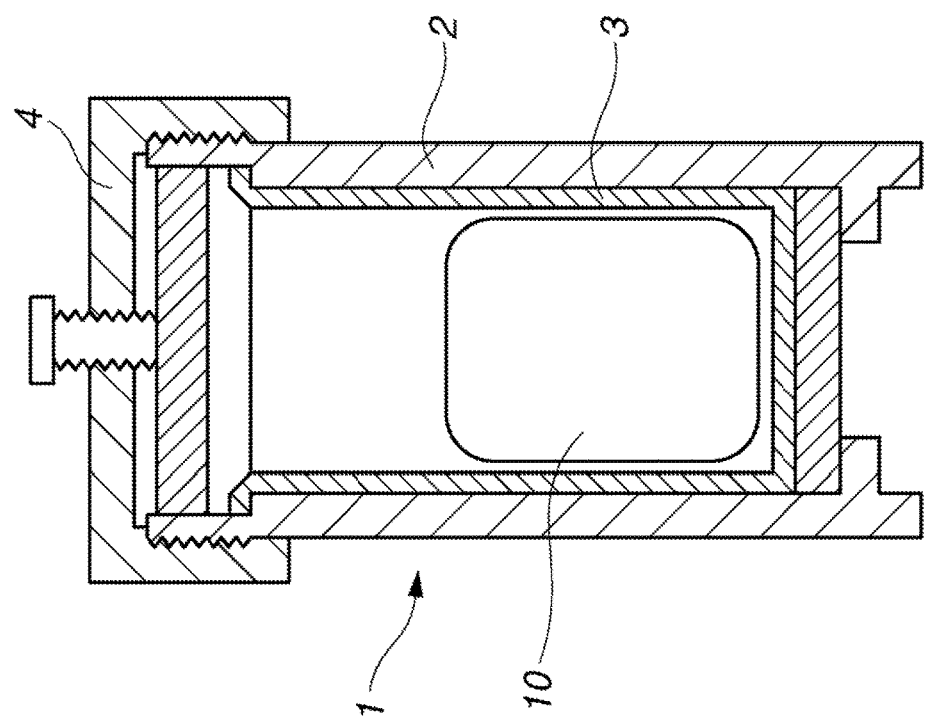
FIG. 1 is a schematic sectional view showing an example of a reaction apparatus used for carrying out the present invention.

A method of producing a complex fluoride phosphor according to one aspect of the present invention will be described below.

A method of producing a phosphor according to the present invention includes:

mixing a red phosphor as a Mn-activated complex fluoride represented by the following formula (1):

$$K_2MF_6:Mn \quad (1)$$

wherein M is one or two or more of tetravalent elements selected from the group consisting of Si, Ti, Zr, Hf, Ge and Sn and necessarily includes Si, with $K_2MnF_6$ in solid state and optionally with a hydrogenfluoride represented by the following formula (2);

$$AF \cdot nHF \quad (2)$$

wherein A is one or two or more of alkali metals and/or ammonium selected from the group consisting of Li, Na, K, Rb and NH, and necessarily includes K, and n is a number of 0.7 to 4, in solid state; and heating the resulting mixture at a temperature of 100° C. to 500° C.

The phosphor of the formula (1) which is used as a raw material here is not particularly limited. Since the Mn content of the phosphor as the product is desirably as high as possible and Mn distribution is desirably as uniform as possible, however, it is preferable that the molar ratio Mn/(M+Mn) of Mn to M+Mn is at least 0.01, more preferably at least 0.02. While the production of the raw material phosphor will be described by showing actual examples later, the production can be performed by a known method such as the wet process described in Patent Document 3 or 4, and the dry process described in Patent Document 5.

As $K_2MnF_6$ to be used in the method of producing a phosphor according to the present invention, there can be used $K_2MnF_6$ that is prepared by any of known methods, such as: (A) a method of reducing potassium permanganate by hydrogen peroxide in the presence of potassium fluoride as described in H. Bode, H. Jenssen, F. Bandte, Angew. Chem., vol. 65, 1953, p. 304 (Non-Patent Document 1); (B) a method of heating a mixture of manganese with an anhydrous chloride of alkali metal in a stream of fluorine gas as described in E. Huss, W. Klemm, Z. Anorg, Allg. Chem., vol. 262, 1950, p. 25 (Non-Patent Document 2); and (C) a method of synthesizing $K_2MnF_6$ by electrolytic reaction of a liquid including manganese fluoride as described in B. Cox, A. G. Sharpe, J. Chem. Soc., 1954, p. 1798 (Non-Patent Document 3) or New Experimental Chemistry Course 8, "Synthesis of Inorganic Compounds III," edited by The Chemical Society of Japan, published by Maruzen Co., Ltd., 1977, p. 1166 (Non-Patent Document 4).

As for the mixing ratio of the raw material phosphor and $K_2MnF_6$, the total amount of Mn, namely, the amount of Mn supplied from the phosphor plus the amount of Mn added as $K_2MnF_6$, is 0.06 to 0.3 mol, preferably 0.1 to 0.25 mol per 1 mol of the element M. Here, the ratio of Mn to M+Mn in the product phosphor tends to be lowered as compared with the value thereof in the starting charge, due to the reaction described later and the subsequent treatment. Taking this tendency into consideration, therefore, the ratio of Mn to M in the starting charge is preferably within the above-mentioned range. If the amount of Mn per 1 mol of M is less than 0.06 mol, the amount of the activating agent Mn in the product phosphor may be insufficient, and absorption of blue light is weak, resulting in that red light cannot be obtained sufficiently. If the amount of Mn is increased beyond 0.3 mol, luminescence characteristics may rather be lowered.

Mixing of these raw materials can be conducted by an arbitrary method, such as a method in which both the raw materials are placed in a bag formed of polyethylene or the like, and the bag is subjected to shaking, rotation and/or the like, a method wherein the raw materials are placed in a container with a cover formed of polyethylene or the like and the container is handled by a rocking mixer, a tumbler mixer or the like, and a method in which the raw materials are ground and mixed together in a mortar.

Further, the mixture obtained as above is admixed with the hydrogenfluoride represented by the above formula (2)

in solid state, followed by heating, whereby a reaction can be accelerated. Examples of the material which can be used as the hydrogenfluoride include commercial products of ammonium hydrogenfluoride ($NH_4HF_2$), sodium hydrogenfluoride ($NaHF_2$), potassium hydrogenfluoride ($KHF_2$) and the like, and $KF.2HF$ and so on.

The amount of the hydrogenfluoride to be added is such that the amount of the alkali metal or the like A is preferably 0 to 2.5 mol, more preferably 0.1 to 2.0 mol per 1 mol of the above main constituent metal M. If the amount of the hydrogenfluoride is increased to exceed 2.5 mols, this produces no advantage in preparation of the phosphor, but, rather, may cause the reaction product to be lumpy and difficult to loosen into particles.

A method for mixing (admixing) of the hydrogenfluoride is not particularly restricted. Since heat may be generated during this mixing, however, it is desirable to avoid a method in which the materials are ground and mixed together under strong forces, and to mix the materials in a short time.

Note that the mixing of the hydrogenfluoride may be conducted simultaneously with the mixing of the raw material phosphor and $K_2MnF_6$, but, taking the above-mentioned points into account, it is preferable to preliminarily mix the raw material phosphor with $K_2MnF_6$ to form a mixture and thereafter admix the mixture with the hydrogenfluoride.

Also, it is effective to add a nitrate, sulfate, hydrogen sulfate or fluoride of an alkali metal aside from and together with, the hydrogenfluoride, as another reaction accelerator. It is preferable that the alkali metal includes one or two or more of alkali metals selected from the group consisting of Li, Na, K and Rb and particularly includes K. In this case, the amount (in moles) of the alkali metal salt or salts added together with the hydrogenfluoride is preferably not more than the amount (in moles) of the hydrogenfluoride.

The raw materials thus mixed are heated. The heating temperature is 100 to 500° C., preferably 150 to 450° C., and more preferably 170 to 400° C. The heating may be conducted in any atmosphere selected from air, nitrogen gas, argon gas, vacuum and the like. However, a reducing atmosphere including hydrogen gas is not preferable for use as the heating atmosphere, since the heating the raw material mixture in the reducing atmosphere may lead to a lowering in luminescence characteristics due to reduction of manganese.

A method wherein the mixture of the raw materials is placed in a sealed container and the container is placed into a dryer or oven or the like, and a method wherein the mixture of the raw materials is placed in a container having a gas release port and is directly heated by a heater from outside the container are both applicable. In the case where the sealed container is used, it is preferable that the container portion coming into contact with the reactants is formed of a fluororesin. This is not limitative, and a fluororesin-made container can be preferably used in the cases where the heating temperature is up to 270° C. Where the heating temperature is higher than this value (270° C.), it is preferable to use a ceramic-made container. In this case, the ceramic is preferably alumina, magnesia, magnesium aluminum spinel or the like.

More specifically, it is preferable to use, as the reaction vessel, a double-walled container 1 as shown in FIG. 1 including a stainless steel-made container main body 2 and a polytetrafluoroethylene-made inner layer 3 formed at the inner wall of the container main body 2, and in which a powder mixture 10 is brought to reaction by heating. Note that the material of a cover 4 used here is preferably stainless steel.

The reaction product obtained as above may include an unreacted hexafluoromanganate mixed therein, aside from the desired complex fluoride phosphor, and the hydrogenfluoride is also left therein. The unreacted hexafluoromanganate and the remaining hydrogenfluoride can be removed by washing.

For the washing, there can be used solutions of inorganic acids such as hydrochloric acid, nitric acid, hydrofluoric acid, etc. and solutions of fluorides such as ammonium fluoride, potassium fluoride, etc. Among these, preferred are hydrofluoric acid and ammonium fluoride. Besides, a water-soluble organic solvent such as ethanol and acetone may be added, for the purpose of restraining elution of the phosphor component. Further, it is also effective to preliminarily dissolve the raw material $K_2MF_6$ in the washing liquid. After the washing, the solid content is dried by an ordinary method, to obtain a Mn-activated complex fluoride phosphor.

Now, a complex fluoride phosphor according to another aspect of the present invention will be described below.

A phosphor according to the present invention is a red phosphor and represented by the following formula (1):

$$K_2MF_6:Mn \qquad (1)$$

wherein M is one or two or more of tetravalent elements selected from the group consisting of Si, Ti, Zr, Hf, Ge and Sn and necessarily includes Si, wherein the molar ratio or atomic ratio represented by the following formula (3);

$$Mn/(M+Mn) \qquad (3)$$

wherein M is the same as M in the above formula (1), is in the range from 0.06 to 0.25, and an internal quantum efficiency of fluorescence with respect to excitation light of 450 am is at least 0.75.

The ratio of Mn to M+Mn represented by the above formula (3) is determined by calculation from the results of analysis of Mn and the M element or elements (Si etc.) conducted by dissolving the whole amount of the phosphor in diluted hydrochloric acid or the like and subjecting the resulting solution to inductively coupled plasma (ICP) emission spectroscopy or the like. If the ratio of Mn to M+Mn is below 0.06, absorption of blue light is weak, so that red light cannot be obtained sufficiently. If the ratio is above 0.25, on the other hand, no advantage is offered by the high ratio, but, rather, the internal quantum efficiency may be lowered. The value of the formula (3) is preferably in the range of at least 0.09, particularly at least 0.1 and up to 0.2.

The amount (in moles or in the number of atoms) of Si is preferably at least 60%, based on the total amount (in moles or in the number of atoms) of the elements represented by M. More preferably, this amount is at least 80%. The other M elements than Si, such as Ti, Zr, Hf, Ge and Sn may not substantially be included.

An internal quantum efficiency of the phosphor according to the present invention is preferably at least 0.75 as measured with respect to excitation light of 450 nm. If the internal quantum efficiency is less than 0.75, even though blue light is absorbed, the ratio of conversion into red light is low, and the desired red color cannot be obtained. Preferably, an internal quantum efficiency of at least 0.80 is needed. While there is no particular limitation as to the internal quantum efficiency up to its theoretical upper limit of 1.0, the internal quantum efficiency is usually up to 0.95.

An absorbance of the phosphor according to the present invention is preferably at least 0.70, particularly at least 0.72, as measured with respect to excitation light of 450 nm. An upper limit of the absorbance is generally up to 0.95.

EXAMPLES

The present invention will be described more in detail below by showing Reference Examples. Examples and Comparative Examples, but the present invention is not to be limited to the following Examples.

Reference Example 1

Preparation of $K_2MnF_6$

In accordance with the method described in Non-Patent Document 4, $K_2MnF_6$ was prepared in the following manner.

A partition (diaphragm) of a fluororesin ion exchange membrane was provided in the center of a reaction tank made of a polyvinyl chloride, and an anode and a cathode each composed of a platinum plate were disposed respectively in the two chambers defined on the opposite sides of the ion exchange membrane. An aqueous hydrofluoric acid solution including manganese(II) fluoride dissolved therein was placed on the anode side in the reaction tank, whereas an aqueous hydrofluoric acid solution was placed on the cathode side. Both the electrodes were connected to a power source, and electrolysis was conducted under conditions of a voltage of 3 V and a current of 0.75 A. After the electrolysis was over, a solution obtained by saturating potassium fluoride in an aqueous hydrofluoric acid solution was added in excess to the reaction solution on the anode side. The resulting yellow solid product was separated by filtration and collected, to obtain $K_2MnF_6$.

Reference Example 2

Production of Raw Material Phosphor 1

First, 156 cm$^3$ of a 40% by weight aqueous solution of fluorosilicic acid ($H_2SiF_6$) (made by Morita Chemical Industries Co., Ltd.) was mixed with 2,740 cm$^3$ of 50% by weight hydrofluoric acid (HF) (SA-X, made by Stella Chemifa Corp.). To this mixture was added 22.2 g of the $K_2MnF_6$ powder preliminarily produced by the method of Reference Example 1, followed by stirring to effect dissolution (first solution: Si—F—Mn).

Aside from this, 140.3 g of potassium hydrogenfluoride (acidic potassium fluoride, $KHF_2$, made by Stella Chemifa Corp.) was mixed with and dissolved in 1,990 cm$^3$ of pure water (second solution: K—H—F).

While the first solution was stirred at room temperature (15° C.) by use of a stirring blade and a motor, the second solution (15° C.) was added thereto little by little over a period of one minute and 30 seconds. The temperature of the resulting solution reached 26° C., and a light orange precipitate ($K_2SiF_6$:Mn) was formed. The stirring was continued further for ten minutes, followed by separating the precipitate by a Buchner funnel and removing the liquid as adequately as possible. Further, the precipitate was washed with acetone, followed by removing the liquid and vacuum drying, to obtain 130.3 g of a powder product of $K_2SiF_6$:Mn.

The particle size distribution of the thus obtained powder product was measured by an airflow dispersion type laser diffraction method particle size distribution measuring apparatus (HELLS & RODOS, made by Sympatec Inc.). As a result, it was found that the particles of a particle size of up to 2.49 μm accounted for 10% of the total volume (D10=2.49 μm), the particles of a particle size of up to 7.72 μm accounted for 50% of the total volume (D50=7.72 μm), and the particles of a particle size of up to 12.2 μm accounted for 90% of the total volume (D90=12.2 μm).

In addition, when a portion of the product was completely dissolved in diluted hydrochloric acid and the solution was put to ICP emission spectroscopy for analyzing Mn content, the Mn content was found to be 1.42% by weight. Besides, Si content was 11.2% by weight. From these values, the molar ratio Mn/(Mn+Si) was calculated to be 0.0650.

Reference Example 3

Production of Raw Material Phosphor 2

First, 234 cm$^3$ of a 40% by weight aqueous solution of fluorosilicic acid was mixed with 2,660 cm$^3$ of 50% by weight hydrofluoric acid. To this mixture was added 15.27 g of the $K_2MnF_6$ powder preliminarily produced by the method of Reference Example 1, followed by stirring to effect dissolution (first solution: Si—F—Mn).

Apart from this, 156.6 g of potassium fluoride (anhydrous potassium fluoride, KF, made by Stella Chemifa Corp.) was mixed with and dissolved in 1,930 cm$^3$ of pure water (second solution: K—F).

While the first solution was stirred at room temperature (16° C.) by use of a stirring blade and a motor, the second solution (15° C.) was added thereto little by little over a period of one minute and 30 seconds. The temperature of the resulting solution reached 28° C., and a light orange precipitate ($K_2SiF_6$:Mn) was formed. The stirring was continued further for ten minutes, followed by separating the precipitate by a Buchner funnel and removing the liquid as adequately as possible. Further, the precipitate was washed with acetone, followed by removing the liquid and vacuum drying, to obtain 187.3 g of a powder product of $K_2SiF_6$:Mn.

Particle size distribution was measured in the same manner as in Reference Example 2, the results being D10=0.76 μm, D50=3.04 μm, and D90=6.07 μm. In addition, chemical composition analysis was conducted in the same manner as in Reference Example 2; as a result, the Mn content was found to be 0.79% by weight, and the Si content was 11.5% by weight. From these values, the molar ratio Mn/(Mn+Si) was calculated to be 0.0351.

Reference Example 4

Production of Raw Material $K_2SiF_6$

First, 390 cm$^3$ of a 40% by weight aqueous solution of fluorosilicic acid was mixed with 150 cm$^3$ of 50% by weight hydrofluoric acid and 2,350 cm$^3$ of pure water (first solution: Si—F).

Aside from this, 350.8 g of potassium hydrogenfluoride was mixed with and dissolved in 1,930 cm$^3$ of pure water (second solution: K—H—F).

While the first solution was stirred at room temperature (16° C.) by use of a stirring blade and a motor, the second solution (15° C.) was added thereto little by little over a period of one minute and 30 seconds. The temperature of the resulting solution reached 22° C., and a white semi-transparent precipitate ($K_2SiF_6$) was formed. The stirring was continued further for ten minutes, followed by separating the precipitate by a Buchner funnel and removing the liquid as adequately as possible. Further, the precipitate was washed with acetone, followed by removing the liquid and vacuum drying, to obtain 324.3 g of a powder product of $K_2SiF_6$.

Particle size distribution was measured in the same manner as in Reference Example 2, the results being D10=0.49 µm, D50=1.09 µm, and D90=2.44 µm.

Example 1

52.93 g of the $K_2SiF_6$:Mn powder obtained in Reference Example 2 and 3.34 g (corresponding to 0.0135 mol of Mn) of the $K_2MnF_6$ powder obtained in Reference Example 1 were placed in the same polyethylene bag equipped with zipper. The bag was subjected to shaking and slow rotation by hand to mix the powders over a period of five minutes. The molar ratio Mn/(Si+Mn) at the time of mixing was 0.118.

To the mixed powder, 24.73 g of a hydrogenfluoride (acidic potassium fluoride (S), KF.2HF, made by Stella Chemifa Corp.) was further added, followed by mixing the powders in the same manner as above.

The powder mixture was placed in a double-walled container 1 (the internal volume of an inner container: 125 cm$^3$) of the structure shown in FIG. 1, followed by sealing the container hermetically. In FIG. 1, the double-walled container 1 includes a container main body 2 made of stainless steel (SUS) and a polytetrafluoroethylene-made inner layer 3 formed at the inner wall of the container main body 2. The powder mixture 10 was placed in the double-walled container 1, which is hermetically sealed with a SUS-made cover 4, and was heated in an oven. The heating was conducted at a temperature of 250° C. for 12 hours, followed by natural cooling.

As a washing liquid, a solution obtained by dissolving 8.2 g of potassium hexafluorosilicate ($K_2SiF_6$, made by Morita Chemical Industries Co., Ltd.) in 220 cm$^3$ of 50% by weight hydrofluoric acid was preliminarily provided. The above reaction product was added to 200 cm$^3$ of this solution (washing liquid), followed by stirring for ten minutes. The lumpy portions of the powder mixture were loosened into powdery form. The precipitate having become powdery was separated by a Buchner funnel, and was washed by sprinkling the rest of the previously prepared washing liquid onto the precipitate. Further, the precipitate was washed with acetone and collected, followed by vacuum drying, to obtain 62.47 g of a powder product.

Particle size distribution was measured in the same manner as in Reference Example 2, the results being D10=15.1 µm, D50=23.3 µm, and D90=34.4 µm. In addition, chemical composition analysis was conducted in the same manner as in Reference Example 2. As a result, Mn content was found to be 2.31% by weight, and Si content was 10.7% by weight. From these values, the molar ratio Mn/(Mn+Si) was calculated to be 0.110.

Example 2

54.81 g of the $K_2SiF_6$:Mn powder obtained in Reference Example 3 and 2.44 g (corresponding to 0.0099 mol of Mn) of the $K_2MnF_6$ powder obtained in Reference Example 1 were mixed in the same manner as in Example 1. The molar ratio Mn/(Si+Mn) at the time of mixing was 0.073.

To this mixed powder, 25.29 g of a KF.2HF powder was further added, followed by mixing in the same manner as in Example 1. Then, the resulting mixture was subjected to reaction in the same manner as in Example 1.

The same washing liquid as in Example 1 was prepared, with which the reaction mixture was treated in the same manner as above, followed by solid-liquid separation, washing with acetone, and vacuum drying, to obtain 61.84 g of a powder product.

Particle size distribution was measured in the same manner as in Reference Example 2, the results being D10=11.9 µm, D50=17.8 µm, and D90=25.9 µm. Besides, chemical composition analysis was performed in the same manner as in Reference Example 2. As a result, Mn content was found to be 1.44% by weight, and Si content was 11.2% by weight. From these values, the molar ratio Mn/(Mn+Si) was calculated to be 0.0659.

Comparative Example 1

52.85 g (corresponding to 0.24 mol of Si) of the $K_2SiF_6$ powder obtained in Reference Example 4 and 2.46 g (corresponding to 0.0100 mol of Mn) of the $K_2MnF_6$ powder obtained in Reference Example 1 were mixed in the same manner as in Example 1. The molar ratio Mn/(Si+Mn) at the time of mixing was 0.040.

To this mixed powder, 24.52 g of a KF.2HF powder was further added, followed by mixing in the same manner as in Example 1. Then, the resulting mixture was subjected to reaction in the same manner as in Example 1.

The same washing liquid as in Example 1 was prepared, with which the reaction mixture was treated in the same manner as above, followed by solid-liquid separation, washing with acetone, and vacuum drying, to obtain 60.66 g of a powder product.

Particle size distribution was measured in the same manner as in Reference Example 2, the results being D10=10.1 µm, D50=16.2 µm, and D90=24.0 µm. In addition, chemical composition analysis was conducted in the same manner as in Reference Example 2. As a result, Mn content was found to be 0.77% by weight, and Si content was 11.6% by weight. From these values, the molar ratio Mn/(Mn+Si) was calculated to be 0.0339.

Comparative Example 2

First, 156 cm$^3$ of a 40% by weight aqueous solution of fluorosilicic acid was mixed with 2,740 cm$^3$ of 50% by weight hydrofluoric acid. To the resulting solution, 44.4 g of the $K_2MnF_6$ powder preliminarily produced by the method of Reference Example 1 was added, followed by stirring to effect dissolution (first solution: Si—F—Mn).

Aside from this, 140.3 g of potassium hydrogenfluoride was mixed with and dissolved in 260 cm$^3$ of 50% by weight hydrofluoric acid and 1,730 cm$^3$ of pure water (second solution: K—H—F).

While the first solution was stirred at room temperature (16° C.) by use of a stirring blade and a motor, the second solution (15° C.) was added thereto little by little over a period of one minute and 30 seconds. The temperature of the resulting solution reached 26° C., and a light orange precipitate ($K_2SiF_6$:Mn) was formed. The stirring was continued further for ten minutes, followed by separating the precipitate by a Buchner funnel and removing the liquid as adequately as possible. Further, the precipitate was washed with acetone, followed by removing the liquid and vacuum drying, to obtain 135.5 g of a powder product of $K_2SiF_6$:Mn.

Particle size distribution was measured in the same manner as in Reference Example 2, the results being D10=5.92 µm, D50=13.3 µm, and D90=19.8 µm. Besides, chemical composition analysis was performed in the same manner as in Reference Example 2. As a result, Mn content was found to be 2.71% by weight, and Si content was 10.5% by weight. From these values, the molar ratio Mn/(Mn+Si) was calculated to be 0.132.

For the products obtained by Reference Examples (only $K_2SiF_6$:Mn), Examples and Comparative Examples, the composition and the molar ratio Mn/(Mn+Si) as well as the center particle diameter (D50) as a reference are shown in Table 1 below.

TABLE 1

|  | Mn/(Mn + Si) | D50 (μm) |
| --- | --- | --- |
| Reference Example 2 | 0.0650 | 7.72 |
| Reference Example 3 | 0.0351 | 3.04 |
| Example 1 | 0.110 | 23.3 |
| Example 2 | 0.0659 | 17.8 |
| Comparative Example 1 | 0.0339 | 16.2 |
| Comparative Example 2 | 0.132 | 13.3 |

Evaluation of Characteristics

Figure 2:
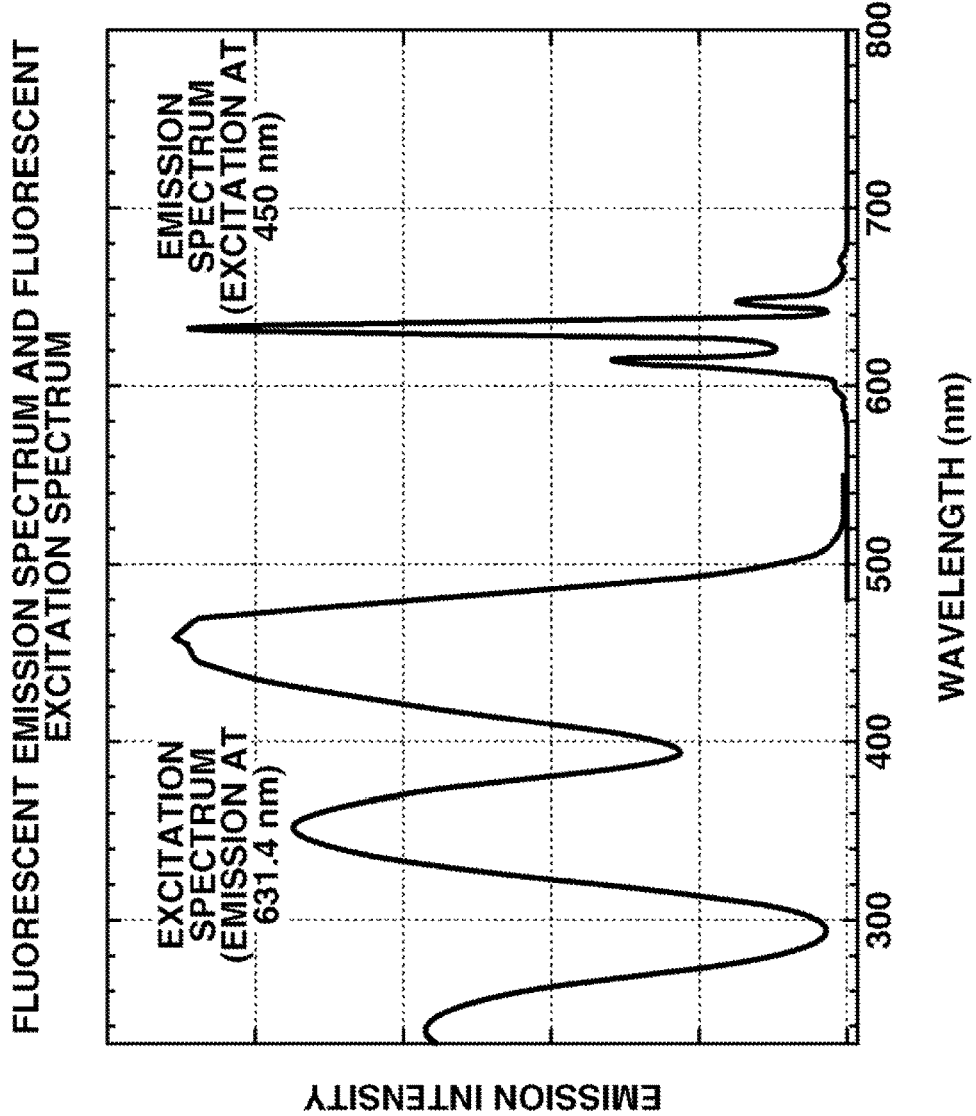
FIG. 2 is a diagram showing a fluorescent emission spectrum and a fluorescent excitation spectrum of a product obtained in Example 1.

The phosphors obtained by Reference Examples, Examples and Comparative Examples were put to measurement of emission spectrum and excitation spectrum by Spectrofluorometer FP6500 (made by JASCO Corp.). All the spectra were similar. As a representative example, the results for the product of Example 1 are shown in FIG. 2. The maximum peak of emission spectrum was at 631.4 nm, and its width (half-value width measured at the position of one half the height of the peak) was 3.8 nm.

In addition, absorbance and quantum efficiency at an excitation wavelength of 450 nm were measured by use of quantum efficiency measurement system QE1100 (made by Otsuka Electronics Co., Ltd.). The absorbance and quantum efficiency at the excitation wavelength of 450 nm are shown in Table 2 below.

TABLE 2

|  | Absorbance | Internal quantum efficiency |
| --- | --- | --- |
| Reference Example 2 | 0.605 | 0.761 |
| Reference Example 3 | 0.447 | 0.688 |
| Example 1 | 0.863 | 0.842 |
| Example 2 | 0.780 | 0.910 |

TABLE 2-continued

|  | Absorbance | Internal quantum efficiency |
| --- | --- | --- |
| Comparative Example 1 | 0.682 | 0.897 |
| Comparative Example 2 | 0.797 | 0.642 |

While the present invention has been described above with reference to embodiments thereof, the present invention is not to be limited to the embodiments. Other embodiments as well as addition, modification, deletion and the like of parts of the embodiments are possible within the ranges that can be thought by a person skilled in the art. Any of those modified modes are embraced in the scope of the present invention so long as they produce the advantageous effects of the present invention.

Evaluation Experiments

Figure 3:
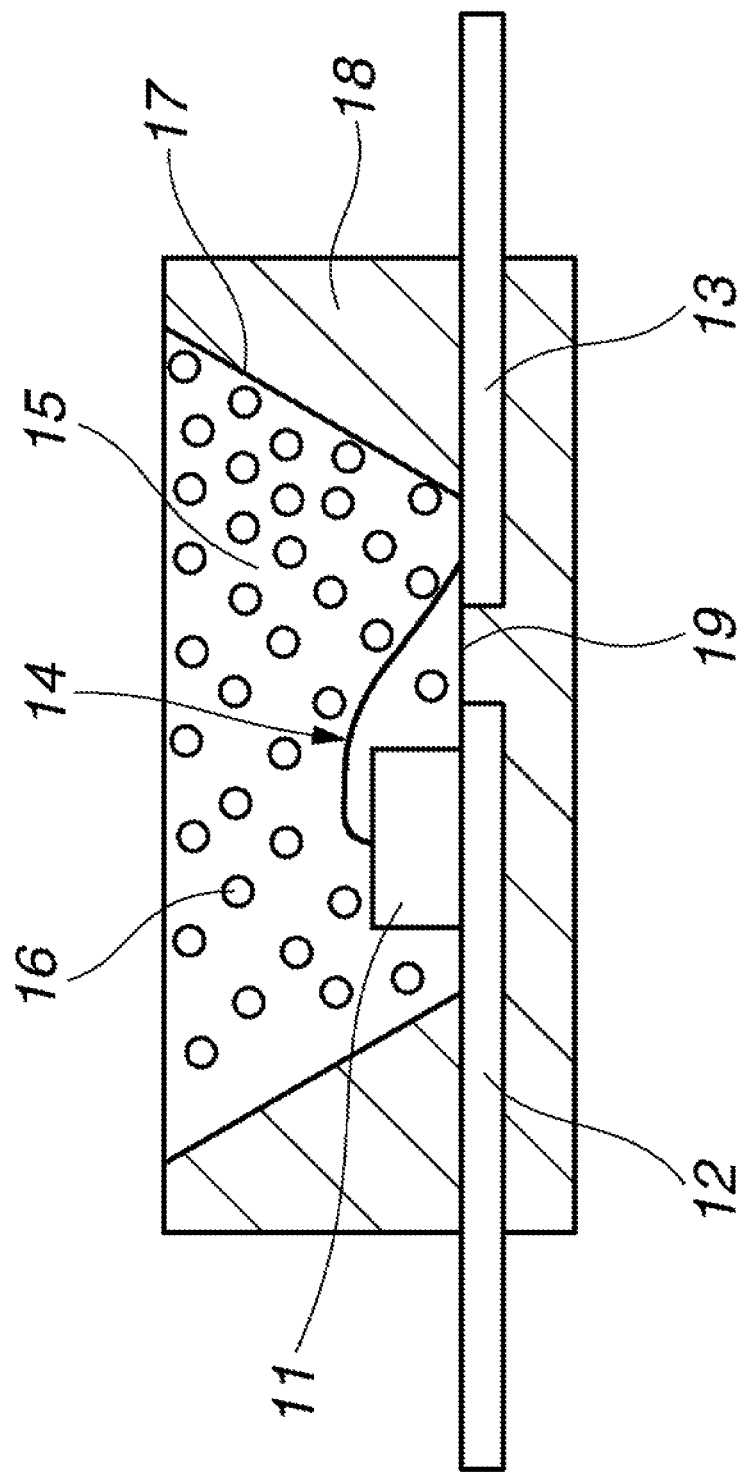
FIG. 3 is a schematic sectional view showing an experimental LED used for Evaluation Experiments in Examples.

Experimental illumination apparatuses shown in FIG. 3 were prepared. A chip 11 is a blue light emitting diode of InGaN-type (SMBB470, made by Epitex Inc.). Electric lines 12, 13 are embedded in an opaque base housing 18 at a recessed portion 19. The electric line 12 is electrically connected to the lower electrode of the chip 11, and electric line 13 is electrically connected through a bonding wire 14 to the upper electrode of the chip 11. A wall surface 17 of the recessed portion 19 can reflect visible light. A liquid thermoplastic resin 15 in which phosphor 16 has been beforehand kneaded is injected into the recessed portion 19 and cured.

Silicone resin (KER-6020A/B made by Shin Etsu Chemical Co., Ltd., two-liquid type (both liquids A and B are mixed at the time of use)), red phosphor of Example 1 or Comparative Example 1, cerium-activated yttrium aluminum garnet ($Y_{2.94}Ce_{0.06}AL_5O_{12}$: YAG (abbr.)) were used, respectively. The YAG phosphor had an average particle size of 2.65 μm, and an internal quantum efficiency of 0.94 measured by the above mentioned condition and method. The silicon and phosphor were mixed according to the compositions (weight) shown in Table 3. The mixture was injected as shown in FIG. 3 and heated in an oven with maintaining a temperature of 120° C. for 30 minutes, and the resin containing the phosphor or phosphors are cured.

The resulting LED was placed inside of Total Luminous Flux Measurement System (made by Otsuka Electronics Co., Ltd., halfmoon size is 500 mmφ). The LED was lighted up by a constant current of 350 mA (with an applied voltage of 3.0 V). An emission spectrum was measured followed by calculation of chromaticity shown in Table 3.

TABLE 3

| | Contents of Mixture (mg) | | | | | | |
| --- | --- | --- | --- | --- | --- | --- | --- |
| | | | Red Phosphor | | | Injected | CIE chromaticity |
| | KER-6020A | KER-6020B | Example 1 | Comparative Example 1 | YAG | Amount (mg) | x | y |
| LED1 | 500.0 | 500.5 | 50.0 | 0 | 0 | 25.6 | 0.203 | 0.120 |
| LED2 | 501.3 | 500.0 | 50.0 | 0 | 25.1 | 9.7 | 0.289 | 0.297 |
| LED3 | 501.3 | 500.0 | 50.0 | 0 | 25.1 | 12.6 | 0.339 | 0.345 |
| LED4 | 501.3 | 500.0 | 50.0 | 0 | 25.1 | 16.8 | 0.381 | 0.388 |
| LED5 | 501.3 | 500.0 | 50.0 | 0 | 25.1 | 20.9 | 0.402 | 0.408 |
| LED6 | 501.3 | 500.0 | 50.0 | 0 | 25.1 | 25.5 | 0.415 | 0.428 |
| LED7 | 501.3 | 500.0 | 50.0 | 0 | 25.1 | 30.0 | 0.435 | 0.444 |
| LED8 | 497.3 | 499.9 | 0 | 50.0 | 24.9 | 9.4 | 0.262 | 0.270 |
| LED9 | 497.3 | 499.9 | 0 | 50.0 | 24.9 | 13.3 | 0.305 | 0.329 |
| LED10 | 497.3 | 499.9 | 0 | 50.0 | 24.9 | 14.5 | 0.303 | 0.330 |
| LED11 | 497.3 | 499.9 | 0 | 50.0 | 24.9 | 18.1 | 0.353 | 0.387 |

TABLE 3-continued

| | Contents of Mixture (mg) | | | | | Injected Amount (mg) | CIE chromaticity | |
|---|---|---|---|---|---|---|---|---|
| | KER-6020A | KER-6020B | Red Phosphor Comparative Example 1 | Red Phosphor Comparative Example 1 | YAG | | x | y |
| | | | Example 1 | Example 1 | | | | |
| LED12 | 497.3 | 499.9 | 0 | 50.0 | 24.9 | 24.0 | 0.376 | 0.410 |
| LED13 | 497.3 | 499.9 | 0 | 50.0 | 24.9 | 27.5 | 0.395 | 0.435 |

Figure 4:
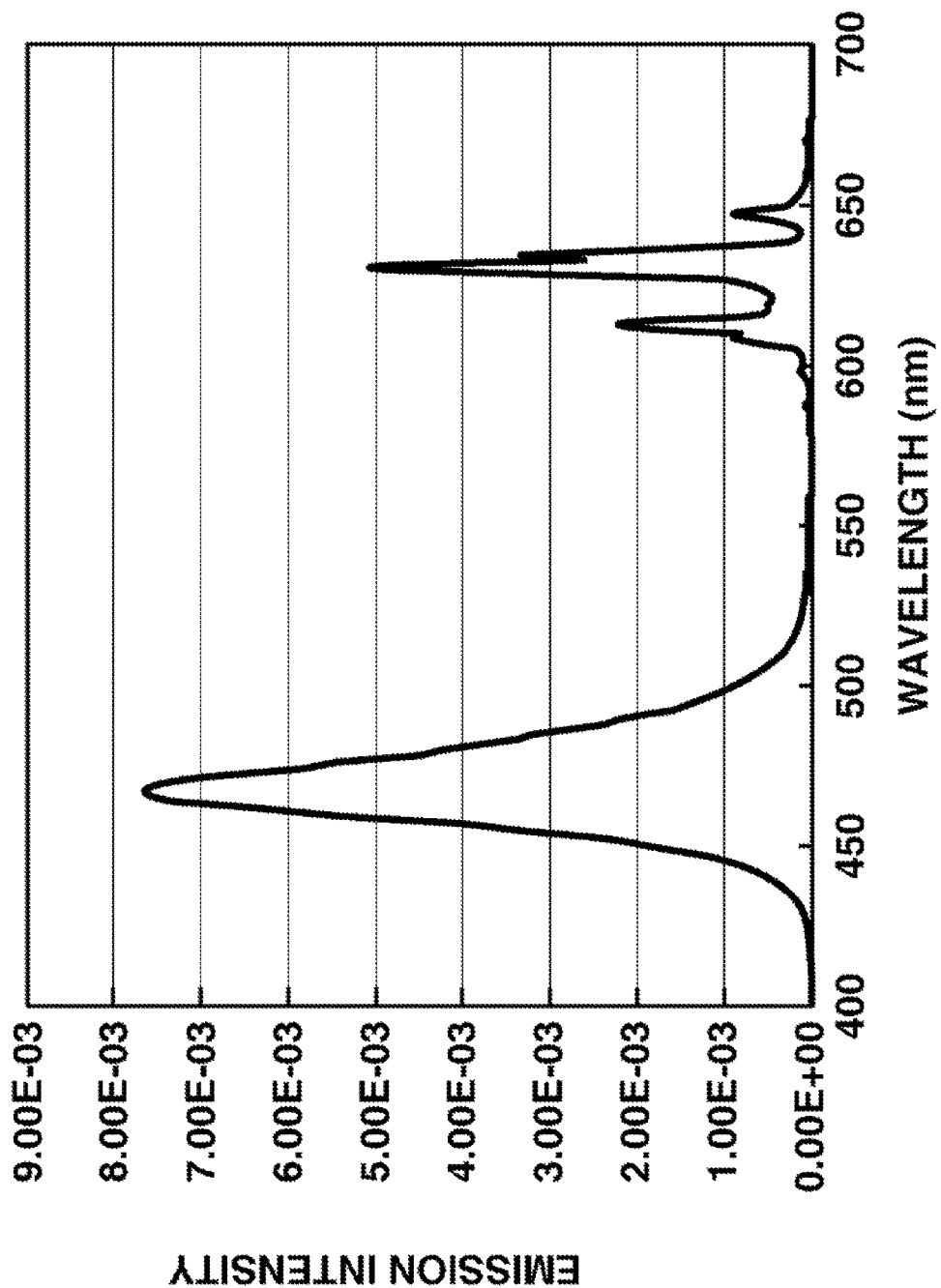
FIG. 4 is a light spectrum of LED1 of Evaluation Experiment in Examples.
Figure 5:
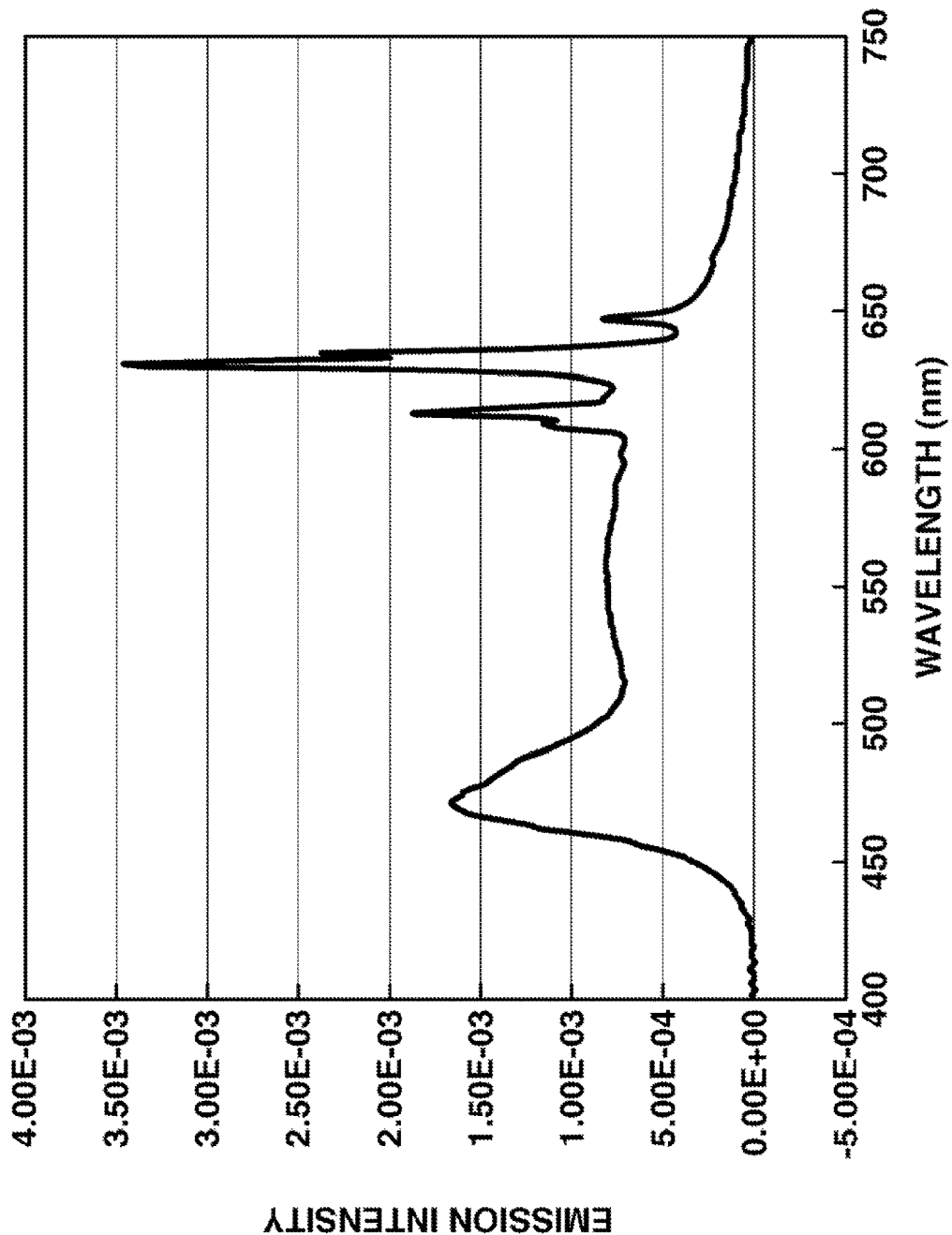
FIG. 5 is a light spectrum of LED2 of Evaluation Experiment in Examples.

Spectrum of LED1 as an example of spectrum of LED generated by combining the blue LED with red phosphor, and Spectrum of LED2 as an example of spectrum of LED generated by combining the blue LED with red phosphor and with YAG phosphor are shown in FIG. 4 and FIG. 5, respectively.

Figure 6:
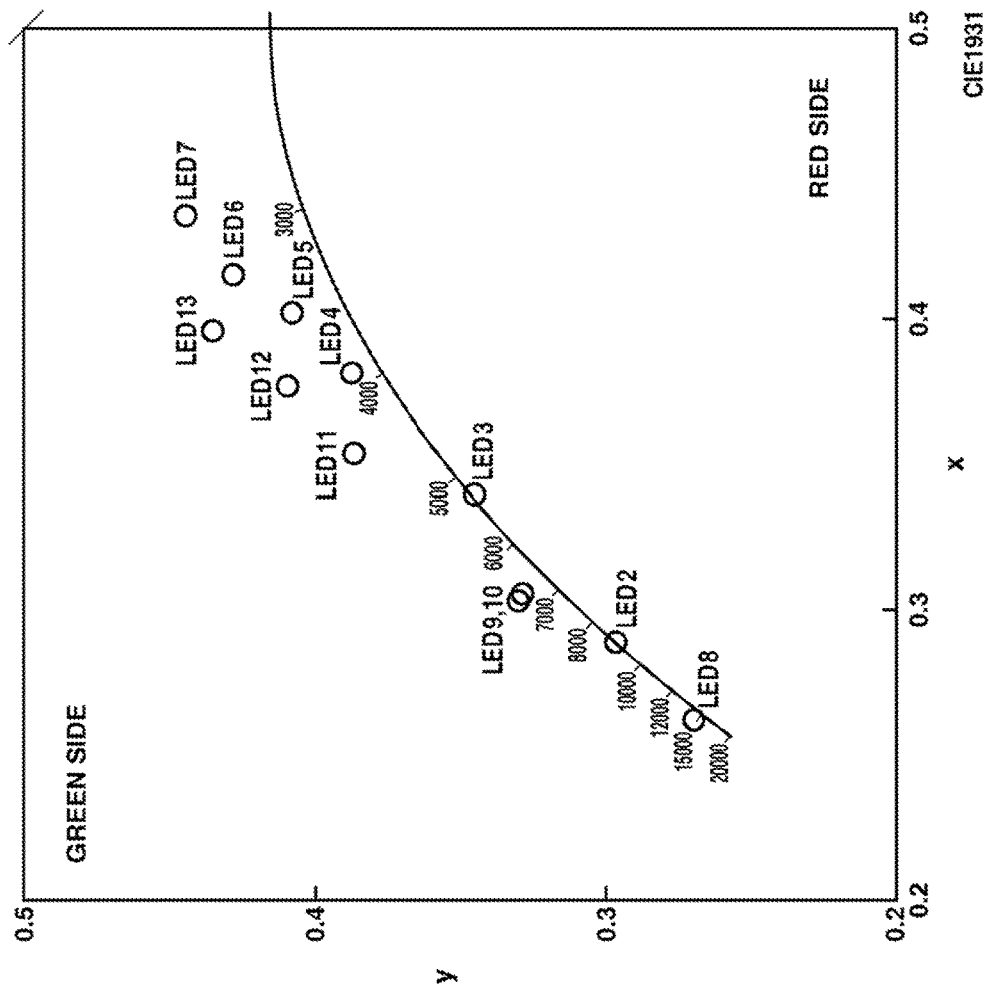
FIG. 6 is a chromaticity diagram showing chromaticity coordinates of respective LEDs in Evaluation Experiments in Examples.

Chromaticityies of LED2 to LED7 (Examples) and LED8 to LED 13 (Comparative Examples) are plotted on x-y chromaticity diagram shown in FIG. 6. FIG. 6 indicates that LEDs of Examples emit light having a warmer color, i.e., closer to red, than light of Comparative Examples when both lights are compared on the basis of the same mix ratio.

Japanese Patent Application Nos. 2015-202674, 2016-136010 and 2016-173363 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of producing a Mn-activated complex fluoride phosphor, the method comprising:

mixing a red phosphor as a Mn-activated complex fluoride represented by the following formula (1):

$$K_2MF_6:Mn \quad (1)$$

wherein M is one or two or more of tetravalent elements selected from the group consisting of Si, Ti, Zr, Hf, Ge and Sn and necessarily includes Si, with $K_2MnF_6$ in solid state; and heating the resulting mixture at a temperature of 100° C. to 500° C., wherein a hydrogenfluoride represented by the following formula (2):

$$AF \cdot nHF \quad (2)$$

wherein A is one or two or more of alkali metals and/or ammonium selected from the group consisting of Li, Na, K, Rb and $NH_4$ and necessarily includes K, and n is a number of 0.7 to 4, in solid state, is mixed with $K_2MnF_6$.

2. The method of claim 1, wherein a reaction mixture obtained by the heating is washed with an inorganic acid solution or a fluoride solution to remove unnecessary components, followed by solid-liquid separation and drying the separated solid.

* * * * *